(12) United States Patent
Akita et al.

(10) Patent No.: US 9,403,344 B2
(45) Date of Patent: Aug. 2, 2016

(54) BONDED BODY MADE FROM DIFFERENT MATERIALS AND METHOD FOR PRODUCING THE SAME

(71) Applicant: HONDA MOTOR CO., LTD., Tokyo (JP)

(72) Inventors: Hiroshi Akita, Wako (JP); Keiichi Sato, Wako (JP); Shinichi Kuroda, Kiryu (JP); Takahiko Kawai, Kiryu (JP)

(73) Assignee: HONDA MOTOR CO., LTD., Tokyo (JP)

( * ) Notice: Subject to any disclaimer, the term of this patent is extended or adjusted under 35 U.S.C. 154(b) by 518 days.

(21) Appl. No.: 14/052,872

(22) Filed: Oct. 14, 2013

(65) Prior Publication Data

US 2014/0272436 A1  Sep. 18, 2014

(30) Foreign Application Priority Data

Mar. 14, 2013 (JP) ................. 2013-052279

(51) Int. Cl.
  *B32B 15/14* (2006.01)
  *B32B 15/20* (2006.01)
  (Continued)

(52) U.S. Cl.
  CPC ................. *B32B 15/20* (2013.01); *B29C 59/14* (2013.01); *B29C 65/5057* (2013.01); *B29C 66/028* (2013.01); *B29C 66/1122* (2013.01); *B29C 66/43* (2013.01); *B29C 66/7392* (2013.01); *B32B 27/12* (2013.01); *B32B 27/20* (2013.01); *B32B 37/1292* (2013.01); *C08J 5/121* (2013.01); *B29C 65/8253* (2013.01); *B29C 66/71* (2013.01); *B29C 66/712* (2013.01); *B29C 66/721* (2013.01);
  (Continued)

(58) Field of Classification Search
None
See application file for complete search history.

(56) References Cited

U.S. PATENT DOCUMENTS 3,585,103 A * 6/1971 Thomson ................ C03C 17/32
                                            156/314
3,979,549 A * 9/1976 Wilkinson .............. B29C 70/68
                                            428/420

(Continued)

FOREIGN PATENT DOCUMENTS

EP      551837    *  1/1993  ................. C08J 5/06
JP   04-189588       7/1992

(Continued)

OTHER PUBLICATIONS

Nanying Ning et al., Realizing the enhancement of interfacial interaction semicrystalline polymer/filler composites via interfacial crystallization, Progress in Polymer Science, U.S., Elsevier, Dec. 27, 2011, 37(2012), pp. 1425-1455. English text.

(Continued)

*Primary Examiner* — Robert S Loewe
(74) *Attorney, Agent, or Firm* — Rankin, Hill & Clark LLP (57) ABSTRACT

A water-repellent film is formed on a first joint surface of a first member that contains any one of a macromolecular material, a metallic material, and an inorganic material. The water-repellent film is subjected to an activation treatment, and is thereby converted into a film having a high hydrophilicity and a nylon 6 contact angle of less than 25°. A second joint surface of a second member that contains at least a thermoplastic resin, which differs from the macromolecular material, is placed on the first joint surface having the film, whereupon the second member is heated and melted. Then, the molten second member is cooled and solidified in order to bond the first joint surface and the second joint surface.

13 Claims, 6 Drawing Sheets (51) Int. Cl.
*B32B 37/12* (2006.01)
*B29C 65/50* (2006.01)
*B29C 65/00* (2006.01)
*B29C 59/14* (2006.01)
*B32B 27/12* (2006.01)
*B32B 27/20* (2006.01)
*C08J 5/12* (2006.01)
*B29C 65/82* (2006.01)

(52) U.S. Cl.
CPC ......... *B29C 66/7212* (2013.01); *B29C 66/7394* (2013.01); *B29C 66/73921* (2013.01); *B29C 66/742* (2013.01); *B29C 66/7422* (2013.01); *B29C 66/7444* (2013.01); *B29C 66/7461* (2013.01); *B29C 66/7465* (2013.01); *B29C 66/74281* (2013.01); *B29C 66/74283* (2013.01); *B29K 2995/0092* (2013.01); *B29K 2995/0093* (2013.01); *B32B 2255/10* (2013.01); *B32B 2255/20* (2013.01); *B32B 2260/021* (2013.01); *B32B 2260/046* (2013.01); *B32B 2262/101* (2013.01); *B32B 2262/106* (2013.01); *B32B 2307/714* (2013.01); *B32B 2307/728* (2013.01); *Y10T 156/10* (2015.01); *Y10T 428/31663* (2015.04)

(56) References Cited

U.S. PATENT DOCUMENTS

| | | | | |
|---|---|---|---|---|
| 4,812,363 A | * | 3/1989 | Bell | ....................... B05D 7/148 156/307.3 |
| 5,174,848 A | * | 12/1992 | Yazaki | ..................... B05D 7/02 156/242 |
| 7,083,694 B2 | * | 8/2006 | Boyle | ............... H01L 21/67306 156/329 |
| 8,052,830 B2 | * | 11/2011 | Sakata | ................ B29C 65/1635 156/272.2 |
| 8,344,044 B2 | * | 1/2013 | Nakamura | .......... B29C 47/0026 428/403 |
| 2002/0185218 A1 | * | 12/2002 | Nakamichi | .............. C08J 5/124 156/272.2 |
| 2004/0211511 A1 | * | 10/2004 | Suzuki | ........................ C08J 5/12 156/273.3 |
| 2010/0193120 A1 | * | 8/2010 | Matsuo | ................... B29C 59/14 156/272.6 |
| 2011/0128399 A1 | * | 6/2011 | Fujii | ................ H01L 27/14632 348/222.1 |
| 2014/0283982 A1 | * | 9/2014 | Pan | ......................... H01L 24/95 156/219 |

FOREIGN PATENT DOCUMENTS

| | | |
|---|---|---|
| JP | 08-080526 | 3/1996 |
| JP | 2009-255429 | 11/2009 |
| JP | 2010-064397 | 3/2010 |
| JP | 2011-257259 | 12/2011 |

OTHER PUBLICATIONS

Japanese Office Action dated Jun. 7, 2016. Partial English translation included.

* cited by examiner

※WATER-REPELLENT FILM SUBJECTED TO ACTIVATION TREATMENT

FIG. 5

※WATER-REPELLENT FILM NOT FORMED

FIG. 6

※HYDROPHILIC FILM SUBJECTED TO ACTIVATION TREATMENT

BONDED BODY MADE FROM DIFFERENT MATERIALS AND METHOD FOR PRODUCING THE SAME

CROSS-REFERENCE TO RELATED APPLICATION

This application is based upon and claims the benefit of priority from Japanese Patent Application No. 2013-052279 filed on Mar. 14, 2013, the contents of which are incorporated herein by reference.

BACKGROUND OF THE INVENTION

1. Field of the Invention

The present invention relates to a bonded body made from different materials, which is obtained by bonding a first joint surface of a first member containing a metallic or inorganic material to a second joint surface of a second member containing a thermoplastic resin. The present invention further relates to a method for producing the bonded body.

2. Description of the Related Art

A bonded body made from different materials (a so-called different-material-bonded body) is produced by thermally weld-bonding a member, which is composed of a thermoplastic resin, to another member which is composed of a metallic or inorganic material. By way of known technology, the thermoplastic resin having a low melting point is molten and is brought into contact with the metallic or inorganic material. Then, the thermoplastic resin is cooled and solidified to result in mutual bonding of the members.

The metallic or inorganic material has a relatively low wettability in coaction with the molten thermoplastic resin. In other words, the thermoplastic resin is likely to be repelled by the metallic or inorganic material. Therefore, it is difficult to increase the contact area between the thermoplastic resin and the metallic or inorganic material. Thus, it is difficult to increase the bonding strength of the different-material-bonded body.

However, particularly in the case of using the different-material-bonded body as a structural component, the different-material-bonded body is required to have a high bonding strength. Japanese Laid-Open Patent Publication No. 2009-255429 and Japanese Laid-Open Patent Publication No. 2010-064397 propose a method, which contains the steps of chemically etching a joint surface of a metallic material to form microscopic pores therein, introducing the molten thermoplastic resin into the microscopic pores, and cooling and solidifying the thermoplastic resin in this state. According to this method, bonding strength can be increased by a so-called anchor effect.

SUMMARY OF THE INVENTION

The above method requires equipment including a storage tank for storing an etchant, a treatment tank for treating waste liquid produced during chemical etching, etc. Thus, a large treatment apparatus inevitably is required with this method. Furthermore, with this method, treatment of waste liquid is required, resulting in high cost.

In addition, it takes a long time to carry out chemical etching. Therefore, disadvantageously, the different-material-bonded body cannot be produced efficiently using the above method. In the case of using small members, a large number of members can be bonded in a batch process. However, in the case of using large members, the treatment tank is required to have a large size and volume, and localized treatments cannot be performed, leading to further increases in production costs.

A principal object of the present invention is to provide a different-material-bonded body that exhibits excellent bonding strength.

Another object of the present invention is to provide a method capable of producing a different-material-bonded body at low cost using simple equipment.

According to an aspect of the present invention, there is provided a bonded body made from different materials (a different-material-bonded body) comprising a first member and a second member, wherein:

the first member contains any one of a macromolecular material, a metallic material, and an inorganic material;

the second member contains at least a thermoplastic resin, which differs from the macromolecular material;

a first joint surface of the first member is bonded to a second joint surface of the second member;

a film, which is formed on the first joint surface, contains C and Si, has an atomic concentration ratio C/Si of less than 1 (atomic %/atomic %), and has a highly hydrophilic surface with a molten nylon 6 contact angle of less than 25°; and a trans-crystal of the thermoplastic resin is generated on the second joint surface.

In the present invention, hydrophobicity and hydrophilicity of the film are properties relative to the water contact angle on the surface of the film, based on the atomic concentration ratio C/Si. The term "highly hydrophilic" implies that the surface of the film has a water contact angle of 10° or less. The term "water-repellent" implies that the surface of the film has a water contact angle of 90° or more.

The trans-crystal is bonded to the highly hydrophilic surface of the film, whereby the portion to be bonded exhibits excellent bonding strength. The highly hydrophilic surface has a molten nylon 6 contact angle of less than 25°, and thus, the highly hydrophilic surface has excellent wettability with respect to the molten thermoplastic resin. As a result, the contact area between the first and second members increases. For this reason, the first and second members are prevented from becoming separated from each other.

In the case that a water-repellent film is formed on the first member, a trans-crystal is not generated on the second member, and the first and second members are bonded with an adhesive. In this case, the portion to be bonded exhibits low bonding strength, and the water-repellent film undergoes internal fracturing. It is presumed that a strong bonding force is generated between the first and second members in the present invention, because the highly hydrophilic surface and the trans-crystal have a high affinity for each other.

The second member preferably contains a fiber-reinforced resin containing a reinforcing fiber.

According to another aspect of the present invention, there is provided a method for producing a different-material-bonded body, the bonded body comprising a first member and a second member, wherein the first member contains any one of a macromolecular material, a metallic material, and an inorganic material, the second member contains at least a thermoplastic resin, which differs from the macromolecular material, and the bonded body is obtained by bonding a first joint surface of the first member to a second joint surface of the second member, the method comprising the steps of:

forming a hydrophobic water-repellent film on the first joint surface, wherein the water-repellent film contains C and Si, has an atomic concentration ratio C/Si of greater than 1

(atomic %/atomic %), and has a water contact angle greater than that of the first joint surface;

subjecting the water-repellent film to an activation treatment to thereby convert a surface of the water-repellent film into a film having an atomic concentration ratio C/Si of less than 1 (atomic %/atomic %), a molten nylon 6 contact angle of less than 25°, and high hydrophilicity;

placing the first joint surface on the second joint surface, and heating the first joint surface and the second joint surface to melt the second member; and cooling and solidifying the molten second member, thereby bonding the first joint surface and the second joint surface while generating a trans-crystal on the second joint surface in the vicinity of an interface between the first and second joint surfaces.

The first and second members, which are bonded by performing the above steps, exhibit excellent bonding strength and are prevented from becoming separated from each other. In the case that the water-repellent film is not subjected to an activation treatment, the film exhibits poor wettability with respect to the thermoplastic resin in the second member. Furthermore, in the case that a low-hydrophobic film having an atomic concentration ratio C/Si of less than 1 (atomic %/atomic %) is subjected to an activation treatment, the contact angle of the molten second member (the thermoplastic resin) cannot be reduced effectively, and a trans-crystal is not generated during the weld-bonding process. Consequently, the resultant bonded portion exhibits lower bonding strength as compared with the case of subjecting the water-repellent film to the activation treatment.

For example, it is preferred that the water-repellent film is formed by a chemical vapor deposition (CVD) process using a plasma apparatus. In such a process, a plasma gas is brought into contact with a starting material, and a generated decomposition product is deposited by means of a chemical reaction on the surface of the first member to form the film. In this manner, the water-repellent film is formed from the starting material on the first member.

The activation treatment of the water-repellent film may be a plasma treatment, in which a plasma gas is brought into contact with the water-repellent film during treatment thereof. The chemical composition of the surface of the water-repellent film is effectively modified by this treatment. Consequently, wettability with respect to the thermoplastic resin in the second member is significantly improved, and a trans-crystal is generated upon being weld-bonded to the first member.

It is preferred that the first joint surface is cleaned before the step of forming the water-repellent film on the first joint surface. This is because impurities remaining on the first joint surface may act to inhibit formation of the film.

Cleaning may also be performed by means of a plasma treatment. Thus, a plasma gas may be brought into contact with the first joint surface during cleaning thereof.

Similarly, it is preferred that the second joint surface is cleaned before the step of placing the first joint surface on the second joint surface. This is because impurities remaining on the second joint surface may act to inhibit weld bonding.

Cleaning may be performed by means of a plasma treatment. Thus, a plasma gas may be brought into contact with the second joint surface during cleaning thereof.

As described above, according to the present invention, the steps of cleaning, film formation (the formation of the water-repellent film), and activation can be achieved by carrying out a plasma treatment. In this case, multiple different types of apparatus are not required to perform such steps, and the bonded body can advantageously be produced using simple equipment with a low equipment investment cost.

The plasma gas may be discharged to atmosphere. Thus, a so-called atmospheric-pressure plasma treatment may be carried out. In this case, it is not necessary to prepare apparatus such as a discharge pump and a chamber. Thus, the equipment can be further simplified, and equipment investment costs can be further lowered.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a different-material-bonded body and a production method according to the present invention will be described in detail below with reference to the accompanying drawings.

Figure 1:
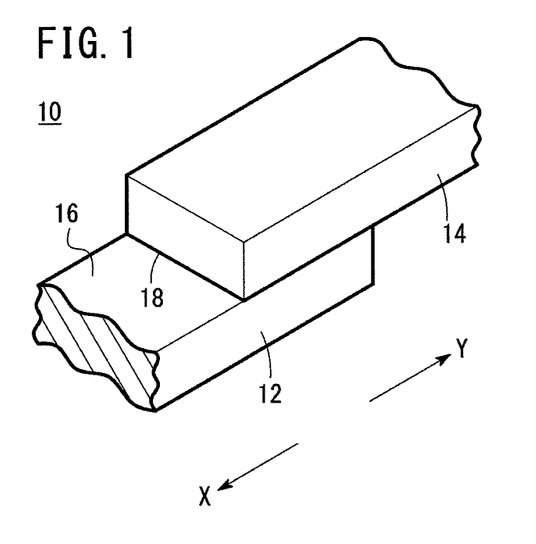
FIG. 1 is an overall schematic perspective view of a different-material-bonded body according to an embodiment of the present invention.

FIG. 1 is an overall schematic perspective view of a different-material-bonded body 10 according to the present embodiment. In the different-material-bonded body 10, a portion of a first member 12 overlaps with a portion of a second member 14, and the respective portions are bonded to each other. The first member 12 has an upper surface containing the portion thereof (hereinafter referred to as a first joint surface 16), and the second member 14 has a lower surface containing the portion thereof (hereinafter referred to as a second joint surface 18).

The first member 12 contains a macromolecular material, a metallic material, or an inorganic material. Specific examples of suitable macromolecular materials include various thermosetting resins. The macromolecular material may be a thermoplastic resin. Preferred specific examples of metallic materials include aluminum, aluminum alloys, copper, copper alloys, iron, and stainless steel. Preferred specific examples of inorganic materials include carbon materials, glass, and ceramics.

Figure 2:
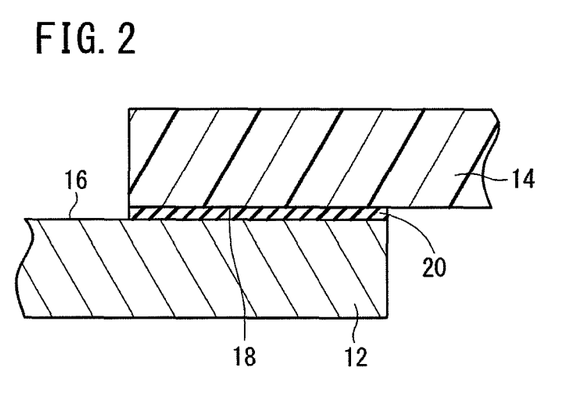
FIG. 2 is an enlarged vertical cross-sectional view of a principal part in the vicinity of a bonding interface in the different-material-bonded body of FIG. 1.

As shown in FIG. 2, which is an enlarged cross-sectional view of the bonding interface of the different-material-bonded body 10, a highly hydrophilic film 20 is formed on the first joint surface 16 of the first member 12 by subjecting a water-repellent film to an activation treatment (to be described later). The highly hydrophilic film 20 has a surface property that exhibits a remarkably small contact angle of a molten thermoplastic resin in the second member 14.

The second member 14 contains a thermoplastic resin such as polyamide resin, polyvinyl chloride resin, polypropylene resin, styrol resin, ABS resin, fluororesin, polycarbonate, or acetal resin, and may contain a fiber-reinforced thermoplastic resin (FRTP) containing a reinforcing fiber such as carbon fiber or glass fiber. In the case that a thermoplastic resin is used as the macromolecular material in the first member 12, the thermoplastic resin in the second member 14 differs from the macromolecular material.

Figure 3:
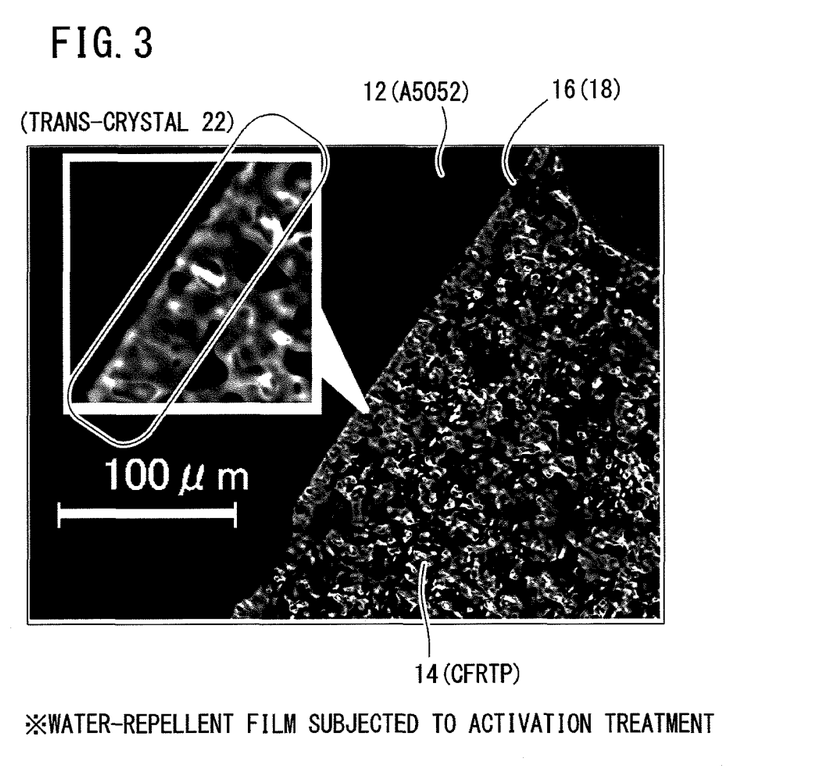
FIG. 3 is a polarizing microscope photograph of the aforementioned principal part in the vicinity of the bonding interface.

A polarizing microscope photograph of a principal part in the vicinity of the bonding interface is shown in FIG. 3. In FIG. 3, an aluminum alloy A5052 sheet is used as the first member 12, and an FRTP (CFRTP) sheet prepared by impregnating a carbon fiber sheet with a polyamide resin of nylon 6 is used as the second member 14. The black region shown on the left corresponds to the A5052 sheet. Furthermore, hexamethyldisiloxane is used as a starting material for forming the water-repellent film. The highly hydrophilic film 20 is formed on the aluminum sheet by activation-treating the water-repellent film.

The principal part in the vicinity of the bonding interface, which is shown in the upper left of FIG. 3, is further enlarged. As is clear from FIG. 3, a trans-crystal 22 of polyamide is generated on the second joint surface 18 of the second member 14 and extends in a direction perpendicular to the bonding interface. Thus, in the different-material-bonded body 10, the highly hydrophilic film 20 (see FIG. 2) and the trans-crystal 22 (see FIG. 3) confront one another in the portion to be bonded.

The portion to be bonded with the highly hydrophilic film 20 and the trans-crystal 22 exhibits an excellent and improved bonding strength, more than is possible without the highly hydrophilic film 20 and the trans-crystal 22. When the different-material-bonded body 10 is broken by pulling the first member 12 and the second member 14 in the directions of arrows X and Y, as shown respectively in FIG. 1, the resin component, the reinforcing fiber, etc., in the second member 14 (the CFRTP sheet) remains on the fractured surface of the first member 12. Therefore, the first member 12 and the second member 14 do not become separated from each other at the bonding interface, and the second member 14 is fractured internally. Thus, the tensile shear strength of the bonded portion is higher than that of the second member 14.

In addition, even in the case that a metallic material is used in the first member 12, electrochemical corrosion can be prevented from occurring due to the fact that the highly hydrophilic film 20 has an insulation property. Thus, the different-material-bonded body 10 can be prevented from becoming deteriorated due to corrosion or electrochemical corrosion.

The different-material-bonded body 10 can be produced in the following manner.

Initially, the first member 12 is cleaned. During cleaning, the first member 12 may be washed with an organic solvent such as acetone, or alternatively, a plasma treatment may be carried out.

If a plasma treatment is carried out, for example, OPENAIR (registered trademark) PLASMA SYSTEM, which is manufactured by Plasmatreat, may be used. An example of such a plasma generator is shown in FIG. 4.

The plasma generator 30 includes a hollow casing 32, and further includes an electrode 34 disposed in the casing 32. The electrode 34 is electrically connected to a power supply 36 and is energized thereby. A ring-shaped insulator 38 is disposed on the inner wall of the casing 32. The electrode 34 is surrounded by the insulator 38.

Figure 4:
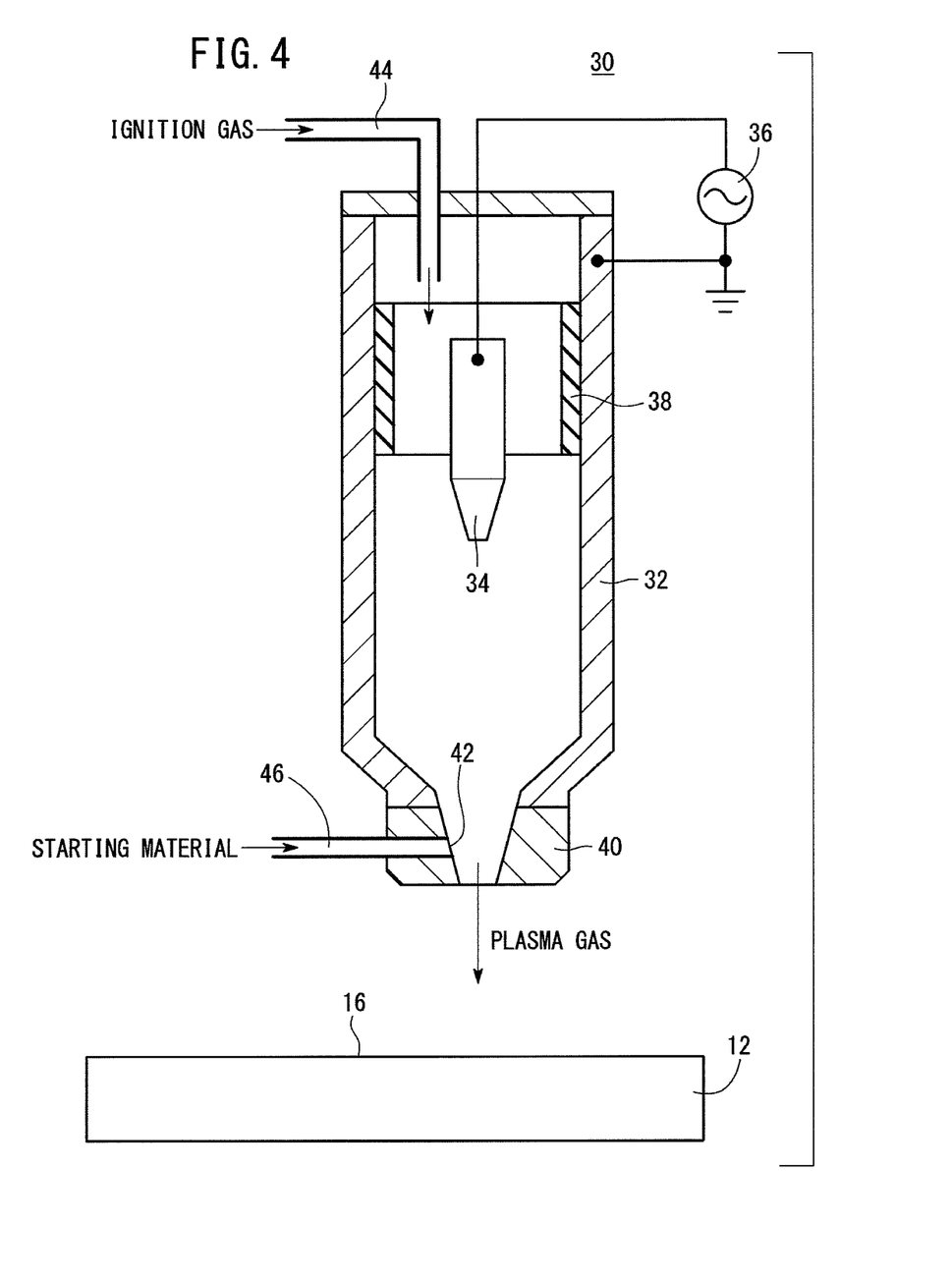
FIG. 4 is a schematic vertical cross-sectional view of a plasma generator, which is used during production of the different-material-bonded body of FIG. 1.

As shown in FIG. 4, a nozzle member 40 is connected to a lower end of the casing 32. The nozzle member 40 has a discharge hole 42 for emitting a plasma gas toward the first joint surface 16 of the first member 12.

A gas supply pipe 44 is connected to an upper end of the casing 32. An ignition gas is introduced into the casing 32 from the gas supply pipe 44. The ignition gas is partially converted into the plasma gas by the electrode 34, whereupon the plasma gas is discharged from the discharge hole 42. The first member 12 is positioned and fixed in facing relation to the discharge hole 42, such that the plasma gas flows toward the first member 12.

A starting material supply pipe 46 is disposed in the vicinity of the discharge hole 42. The starting material supply pipe 46 is connected to a starting material source (not shown). The starting material supply pipe 46 can be moved closer toward or away from the electrode 34 by interposing or removing a spacer (not shown) between the casing 32 and the nozzle member 40. Thus, the distance between the electrode 34 and the starting material supply pipe 46 can be selected appropriately.

A starting material for forming the water-repellent film is introduced from the starting material supply pipe 46 in a direction that is perpendicular to the flow of the plasma gas. The starting material is supplied only during the step of forming the film, as will be described hereinafter, and the starting material is not supplied during the cleaning step.

During the cleaning step, using the plasma generator 30, electric power is applied to the electrode 34 by the power supply 36, and the ignition gas (such as dry air) is introduced from the gas supply pipe 44 into the casing 32. Arc discharge is generated between the electrode 34 and the nozzle member 40 under application of electric power. The ignition gas is partially converted into the plasma gas by the generated arc discharge.

The thus obtained plasma gas is discharged from the discharge hole 42 toward the first member 12. One surface (the first joint surface 16) of the first member 12 is cleaned by scanning the first member 12 with the plasma generator 30.

Next, a water-repellent film is formed on the cleaned first joint surface 16. During this step, plasma gas is discharged from the discharge hole 42, simultaneously with starting supply of the starting material from the starting material supply pipe 46 to thereby form the water-repellent film.

During this step, dry nitrogen preferably is used as an ignition gas. For example, the starting material may be a siloxane compound or a silicon alkoxide compound. More specifically, the starting material may be hexamethyldisiloxane, tetraethoxysilane, tetramethoxysilane, or the like. Furthermore, the starting material may be a compound prepared by substituting an organic group with hydrogen (such as pentamethyldisiloxane or tetramethyldisiloxane), or a compound having a repeated structure of siloxane (such as octamethyltrisiloxane). Incidentally, hexamethyldisiloxane is defined by the following structural formula:

The starting material is partially decomposed due to the high energy of the plasma gas. Thus, a decomposition product is generated. The decomposition product flows toward the first joint surface 16 together with the plasma gas, becomes attached to the first joint surface 16, and is polymerized to generate a polymer. As a result, a film containing a silicate polymer is formed on the first joint surface 16.

Even if the same starting material is used, properties of the film are changed depending on the position where the plasma gas is generated, as well as the distance between the electrode 34 and the starting material supply pipe 46, etc. This feature is known, as described in Plasma Processes and Polymers, Vol. 6, No. 10, pp. 642-648. For example, under conditions that act to reduce the plasma decomposition rate of the siloxane compound, the amount of organic component remaining in the decomposition product is increased. Consequently, the resultant film (silicate polymer) has a high organic component content and exhibits high hydrophobicity.

Thus, during this step, the plasma gas is generated under conditions which are suitable for formation of the water-repellent film. In the case of using a siloxane compound as the starting material, conditions may be selected in view of formation of a water-repellent film having an atomic concentration ratio C/Si of greater than 1 (atomic %/atomic %). The film properties may be examined under various conditions performed in preliminary experiments in order to achieve the aforementioned ratio.

The water contact angle on the water-repellent film is greater than that on the first joint surface 16 without the film. Thus, the water contact angle on the first joint surface 16 is increased by forming the water-repellent film.

Thereafter, the water-repellent film is subjected to an activation treatment. Also in this step, the plasma generator 30 of FIG. 4 preferably is used.

During this step, for example, dry air is supplied as an ignition gas in order to generate the plasma gas. The plasma gas is discharged from the discharge hole 42 toward the water-repellent film. Of course, during this step, it is not strictly necessary to supply the starting material.

The atomic concentration ratio C/Si of the water-repellent film is lowered significantly by the plasma treatment. This is because the C composition ratio is lowered while the O composition ratio is increased. It is presumed that, by means of the activation treatment, the Si—C bond is converted into a Si—OH group.

The water-repellent film is converted into the highly hydrophilic film 20 due to chemical transformation thereof. The highly hydrophilic film 20 has a remarkably small contact angle of the molten thermoplastic resin. Thus, wettability with respect to the molten thermoplastic resin can be significantly improved.

As described above, in the present embodiment, cleaning, formation of the highly hydrophilic film 20, and activation are achieved using a single plasma generator 30. Therefore, the above steps can be carried out efficiently. Furthermore, other types of vacuum apparatus, such as a chamber and a discharge pump, are not needed in the plasma generator 30. Thus, the production equipment can be simplified, and equipment investment costs can be lowered. Of course, a plurality of plasma generators, each having a nozzle optimized for each step, also may be used in combination.

Next, the second joint surface 18 of the second member 14 is placed on the first joint surface 16 including the highly hydrophilic film 20. The overlapped portion is subjected to a heat treatment. If necessary, a load (i.e. pressure) may be applied to the overlapped portion.

The second member 14 (thermoplastic resin) is melted by heating. Due to the activation treatment, the highly hydrophilic film 20 exhibits high wettability with respect to the molten thermoplastic resin. In other words, the highly hydrophilic film 20 can be wetted satisfactorily with the molten thermoplastic resin. Therefore, the contact area between the molten thermoplastic resin and the highly hydrophilic film 20 (the first joint surface 16) can be increased sufficiently.

The thermoplastic resin is cooled and solidified, thereby bonding (weld-bonding) the first joint surface 16 and the second joint surface 18 to each other. During the solidification process, the trans-crystal 22 of the thermoplastic resin is grown on a nucleus of the first member 12 at the bonding interface.

The different-material-bonded body 10, which has the highly hydrophilic film 20 and the trans-crystal 22 at the bonding interface, can be produced in the above manner. The portion to be bonded having the bonding interface exhibits a high bonding strength. Thus, in this embodiment, a different-material-bonded body 10 having excellent bonding strength can be produced.

The present invention is not limited to the aforementioned embodiment. Various changes and modifications may be made to the embodiment without departing from the scope of the invention.

For example, the highly hydrophilic film 20 may be formed by a process other than a plasma CVD process, such as a chemical vapor deposition (CVD) process or a physical vapor deposition (PVD) process in which a plasma treatment is not used. Instead of a plasma treatment, activation may be achieved by heating in an oxidation atmosphere, irradiation with light such as ultraviolet light, an ozone treatment, corona discharge, or the like.

The plasma CVD process may be carried out under a vacuum, as is well known in the art.

The highly hydrophilic film 20 may be formed only on the portion to be bonded of the first joint surface 16, as shown in FIG. 2. It is not necessary for the highly hydrophilic film 20 to be formed over the entire first joint surface 16.

Example 1

A 1.5-mm-thick A5052 (JIS) sheet composed of an Al—Mg alloy was selected as the first member 12. The water contact angle on one surface (first joint surface 16) of the first member 12 was measured. As a result, it was determined that the first joint surface 16 had a water contact angle of 102°.

A plasma gas was emitted from the plasma generator 30 shown in FIG. 4 toward the first joint surface 16 for thereby cleaning the first joint surface 16. During such cleaning, dry air was supplied as an ignition gas at a rate of 3000 liter/hour under a plasma voltage of 300 V and a plasma current of 20 A. The first joint surface 16 was positioned at a distance of 4 mm from the discharge hole 42, and the casing 32 was moved at a rate of 5 m/minute to scan the first joint surface 16.

Dry nitrogen was supplied as the ignition gas instead of dry air at a rate of 1740 liter/hour, and plasma discharge was carried out under a plasma voltage of 283 V and a plasma current of 13 A. The position of the starting material supply pipe 46, at which a hydrophilic film having a ratio C/Si (atomic %/atomic %) of 0.6 to 0.8 could be formed using dry air as the ignition gas, was measured beforehand. In this example, the starting material supply pipe 46 was located 3 mm below the measured position, and thus was farther away from the electrode 34.

Hexamethyldisiloxane was introduced from the starting material supply pipe 46 at a rate of 37 g/hour, while dry nitrogen was supplied as a carrier gas at a rate of 120 liter/hour. The hexamethyldisiloxane was polymerized on the first joint surface 16, thereby forming a water-repellent film. The first joint surface 16 was positioned at a distance of 4 mm from the discharge hole 42, and was scanned with the casing 32 at a rate of 5 m/minute.

The water-repellent film was heated at 120° C. for 30 minutes in atmospheric air. At this point, the water contact angle on the first joint surface 16 (i.e., the water-repellent film) was measured. As a result, it was determined that the first joint surface 16 had a water contact angle of 151°. Thus, it was confirmed that the contact angle was increased due to formation of the water-repellent film. Furthermore, the first joint surface 16 had a nylon 6 contact angle of 138° and a ratio C/Si of 1.25, as measured by X-ray photoelectron spectroscopy (ESCA: electron spectroscopy for chemical analysis). The composition ratio of C was larger than that of Si. In addition, the ratio of O was 48.6 atm %.

Next, the starting material supply pipe 46 was located in the same manner as in the above cleaning step. Dry air was supplied as an ignition gas at a rate of 3000 liter/hour, and a plasma gas was applied to the water-repellent film under conditions of a plasma voltage of 300 V, a plasma current of 20 A, and with a distance of 7 mm between the discharge hole 42 and the first joint surface 16. Consequently, the water-repellent film was activation-treated to form a highly hydrophilic film 20. The casing 32 was moved at a rate of 20 m/minute to scan the first joint surface 16.

At this point, the molten nylon 6 contact angle on the first joint surface 16 (the highly hydrophilic film 20) was measured. As a result, it was determined that the first joint surface 16 had a molten nylon 6 contact angle of 14°, which was less than 25°. Thus, it was confirmed that the contact angle was reduced significantly by means of the activation treatment. The first joint surface 16 had a ratio C/Si of 0.32 as measured by ESCA. Thus, the ratio C/Si also was reduced significantly by means of the activation treatment, and the composition ratio of Si became larger than that of C. In addition, the ratio of O was increased to 64.6 atm % by means of the activation treatment.

It was considered from assay results that functional groups such as OH groups were formed on the water-repellent film as a result of the activation treatment.

A nylon 6 based CFRTP having a carbon fiber volume ratio of about 40% was used in the second joint surface 18. Also, the second joint surface 18 was cleaned. During such cleaning, dry air was supplied as an ignition gas at a rate of 3000 liter/hour under a plasma voltage of 300 V and a plasma current of 20 A. The first joint surface 16 was positioned at a distance of 7 mm from the discharge hole 42, and the casing 32 was moved at a rate of 5 m/minute in order to scan the first joint surface 16.

Next, a portion of the cleaned first joint surface 16 of the A5052 sheet was overlapped with a portion of the second joint surface 18 of the CFRTP sheet, and the stacked members were placed in a hot press apparatus. A lower mold, on which the A5052 sheet was disposed, was heated to 280° C., an upper mold facing the CFRTP sheet was heated to 140° C., and the molds were closed. During this step, pressing was continuously carried out for 5 minutes, such that a load of 1.5 kg was applied per 1 mm² of the weld-bonding area.

The members were left until the molds were cooled to 120° C., whereupon the molds were opened. Thus, the different-material-bonded body 10 of Example 1, containing the A5052 sheet and the CFRTP sheet bonded to each other, was obtained.

FIG. 3 is a polarizing microscope photograph of a principal part in the vicinity of the bonding interface of the different-material-bonded body 10. As shown in FIG. 3, trans-crystals 22 of nylon 6 were generated on the CFRTP sheet in the vicinity of the bonding interface.

The different-material-bonded body 10 was cut in order to prepare a strip having a width of 25.4 mm. An Al tab was attached to either end of the strip to enable a lap shear tensile test to be carried out. As a result of the lap shear tensile test, it was determined that the breaking load was 15.7 MPa per weld-bonded area.

The fracture surface of the A5052 sheet was observed using an optical microscope. As a result, it was determined that the resin component and the carbon fiber remained on the fracture surface of the A5052 sheet. From such a result, it was clear that the CFRTP sheet was fractured internally before the bonded portion formed between the A5052 sheet and the CFRTP sheet was broken.

Comparative Example 1

For comparison, a different-material-bonded body of Comparative Example 1 was produced by pressing and bonding the A5052 sheet and the CFRTP sheet to each other in the same manner as above, except that the members were not cleaned and the water-repellent film was not formed.

Also, in Comparative Example 1, the first joint surface 16 had a water contact angle of 102° prior to bonding.

In Comparative Example 1, the A5052 sheet and the CFRTP sheet could be bonded. However, after the bonded body was left at ordinary room temperature for several minutes, the members became separated from each other at the bonding interface.

Figure 5:
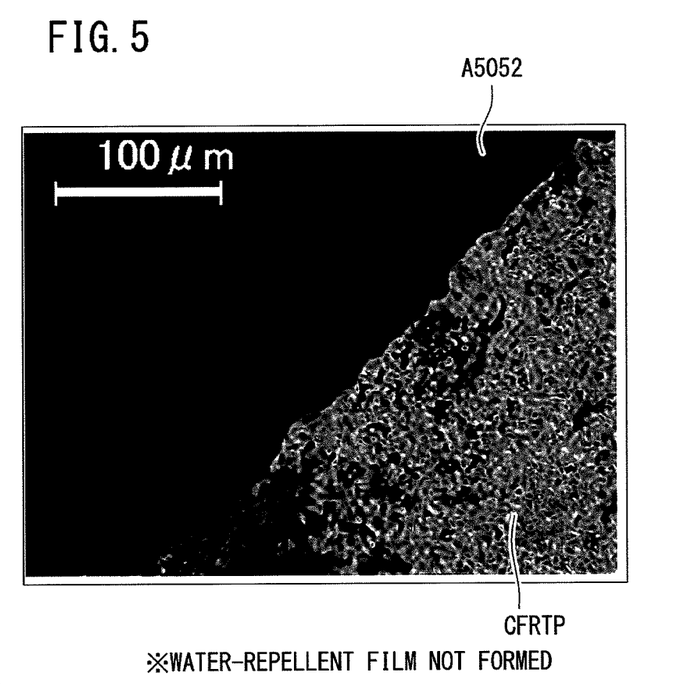
FIG. 5 is a polarizing microscope photograph of a principal part in the vicinity of a bonding interface in a different-material-bonded body, according to a Comparative Example 1.

A principal part in the vicinity of the bonding interface was observed using a polarizing microscope. As shown in FIG. 5, trans-crystals 22 were not generated.

Comparative Example 2

A different-material-bonded body of Comparative Example 2 was produced by forming a film on the first joint surface 16 of the A5052 sheet, in the same manner as Example 1, except that the starting material supply pipe 46 was disposed 3 mm above the position of Example 1, and thus was located closer to the electrode 34. Further, dry air was used as the ignition gas.

In Comparative Example 2, the first joint surface 16 had a water contact angle of 89° before the activation treatment. Due to formation of the film, the water contact angle was reduced. Thus, the formed film was a hydrophilic film.

The nylon 6 contact angle on the first joint surface 16, which was measured before and after the activation treatment, was 80° and 43°, respectively. Thus, unlike Example 1, in Comparative Example 2, wettability was not significantly changed, and the molten nylon 6 contact angle was not reduced to less than 25° as a result of the activation treatment. Furthermore, the ratio C/Si (atomic %/atomic %), which was measured by ESCA before and after the activation treatment, was 0.75 and 0.55, respectively. Thus, the composition was not significantly changed by the activation treatment. In addition, the surface atomic concentration of O (atomic %) was increased only slightly from 46.1 to 58.7, and thus, the increase was smaller than that in Example 1.

The A5052 sheet was stacked on and pressed against the CFRTP sheet in the same manner as Example 1. However, the A5052 sheet and the CFRTP sheet became separated from each other when the molds were opened.

Comparative Example 3

A different-material-bonded body of Comparative Example 3 was produced by forming a film on the first joint surface 16 of the A5052 sheet, in the same manner as Example 1, except that the distance between the electrode 34 and the starting material supply pipe 46 during the film formation step was 1.5 mm larger than that in the cleaning step.

In Comparative Example 3, the water contact angle on the first joint surface 16 was measured prior to carrying out the activation treatment. As a result, it was determined that the first joint surface 16 had a water contact angle of 95°. The water contact angle was reduced due to formation of the film. Thus, also in Comparative Example 3, the formed film was a hydrophilic film. The film had a ratio C/Si of 0.95 and an O composition ratio of 46.1 atm %.

The nylon 6 contact angle on the first joint surface 16, which was measured before and after the activation treatment, was 88° and 25°, respectively.

The A5052 sheet was stacked on and pressed against the CFRTP sheet, in the same manner as Example 1. As a result, the members were bonded to each other. However, after the bonded body was left at room temperature for several days, the members became separated from each other at the bonding interface.

Figure 6:
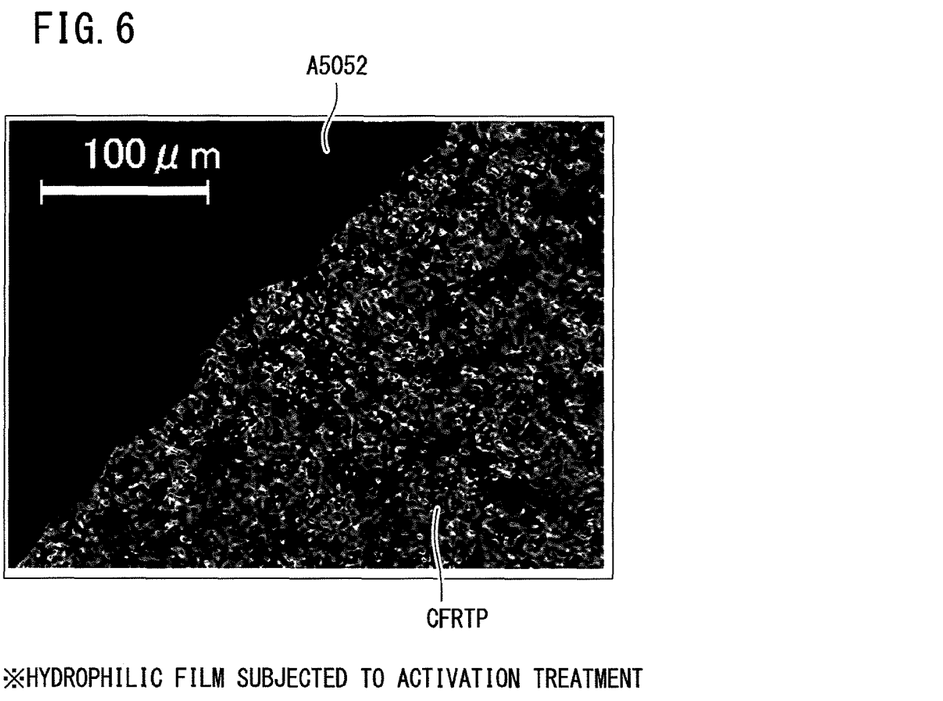
FIG. 6 is a polarizing microscope photograph of a principal part in the vicinity of a bonding interface in a different-material-bonded body, according to a Comparative Example 3.

A principal part in the vicinity of the bonding interface in the bonded state was observed using a polarizing microscope. As shown in FIG. 6, trans-crystals 22 were not generated.

By comparing Example 1 with Comparative Examples 1 through 3, it was made clear that when the water-repellent film was formed on the joint surface and the joint surface was subjected to an activation treatment to form the highly hydrophilic surface, the bonded portions of the different materials could exhibit excellent bonding strength.

Comparative Examples 4 to 7

For further comparison, cleaning of the A5052 sheet, formation of the hydrophilic film, and the activation treatment were carried out under the same conditions as Example 1, and thereafter, the A5052 sheet and the CFRTP sheet were bonded with a second generation acrylic adhesive, whereby a different-material-bonded body of Comparative Example 4 was produced.

Meanwhile, a different-material-bonded body of Comparative Example 5 was produced by bonding the A5052 sheet and the CFRTP sheet with the second generation acrylic adhesive. In Comparative Example 5, cleaning of the A5052 sheet, formation of the hydrophilic film, and the activation treatment were not carried out as in Comparative Example 1.

Furthermore, different-material-bonded bodies of Comparative Examples 6 and 7 were produced by bonding the A5052 sheet and the CFRTP sheet with the second generation acrylic adhesive, respectively. In Comparative Examples 6 and 7, cleaning of the A5052 sheet, formation of the hydrophilic film, and the activation treatment were carried out in the same manner as in Comparative Examples 2 and 3, respectively.

In Comparative Examples 4 to 7, the thermoplastic resin that was used as a base material in the CFRTP sheet was not melted, and trans-crystals 22 were not generated at the bonding interface.

The different-material-bonded bodies were subjected to a lap shear tensile test, in the same manner as Example 1. As a result, it was determined that the breaking load (tensile shear strength) was largest in Comparative Example 6, and was progressively reduced in Comparative Examples 5, 7, and 4, in this order. Incidentally, the breaking loads of Comparative Examples 4 to 7 were smaller than that of Example 1.

Comparing Example 1 with Comparative Examples 2 and 3, as the ratio C/Si of the film on the first joint surface 16 was lowered, the bonding strength was increased. In contrast, in Comparative Examples 4, 6, and 7, as the ratio C/Si of the film was increased, the bonding strength also was increased.

The fracture surface of Comparative Example 4 was subjected to an energy dispersive X-ray analysis. As a result, Si was detected on the CFRTP sheet. This implies that the highly hydrophilic film 20 was fractured internally before the bonded portion between the A5052 sheet and the CFRTP sheet was broken. Thus, the highly hydrophilic film 20 per se did not exhibit a remarkably high bonding strength.

As described above, the highly hydrophilic film 20 formed on the first joint surface 16 of the A5052 sheet in Example 1 was identical with the film formed in Comparative Example 1. Nevertheless, the breaking load of Example 1 was larger than the breaking loads of Comparative Examples 4 to 7. Thus, internal fracturing was caused more easily.

Consequently, it was considered that the affinity of the CFRTP sheet to the highly hydrophilic film 20 was improved by generating the trans-crystal 22 in the vicinity of the bonding interface, whereby a strong bonding force could be formed between the A5052 sheet and the CFRTP sheet.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A bonded body made from different materials, comprising a first member and a second member, wherein:
   the first member contains any one of a macromolecular material, a metallic material, and an inorganic material;
   the second member contains at least a thermoplastic resin, which differs from the macromolecular material;
   a first joint surface of the first member is bonded to a second joint surface of the second member;
   a film, which is formed on the first joint surface, contains C and Si, has an atomic concentration ratio C/Si of less than 1 (atomic %/atomic %), and has a highly hydrophilic surface with a molten nylon 6 contact angle of less than 25°; and
   a trans-crystal of the thermoplastic resin is generated on the second joint surface.

2. The bonded body according to claim 1, wherein the second member contains a fiber-reinforced resin containing a reinforcing fiber.

3. The bonded body according to claim 1, wherein the first member contains any one of a thermoplastic resin, aluminum, an aluminum alloy, copper, a copper alloy, iron, stainless steel, a carbon material, glass, and ceramic.

4. A method for producing a bonded body made from different materials, the bonded body comprising a first member and a second member, wherein the first member contains any one of a macromolecular material, a metallic material, and an inorganic material, the second member contains at least a thermoplastic resin, which differs from the macromolecular material, and the bonded body is obtained by bonding a first joint surface of the first member to a second joint surface of the second member, the method comprising the steps of:
   forming a hydrophobic water-repellent film on the first joint surface, wherein the water-repellent film contains C and Si, has an atomic concentration ratio C/Si of greater than 1 (atomic %/atomic %), and has a water contact angle greater than that of the first joint surface;
   subjecting the water-repellent film to an activation treatment to thereby convert a surface of the water-repellent film into a film having an atomic concentration ratio C/Si of less than 1 (atomic %/atomic %), a molten nylon 6 contact angle of less than 25°, and high hydrophilicity;

placing the first joint surface on the second joint surface, and heating the first joint surface and the second joint surface to melt the second member; and cooling and solidifying the molten second member, thereby bonding the first joint surface and the second joint surface while generating a trans-crystal on the second joint surface in the vicinity of an interface between the second joint surface and the first joint surface.

5. The method according to claim 4, wherein the water-repellent film is formed by bringing a plasma gas into contact with a starting material.

6. The method according to claim 4, wherein the activation treatment of the water-repellent film is performed by bringing a plasma gas into contact with the water-repellent film.

7. The method according to claim 4, wherein the first joint surface is cleaned before the step of forming the water-repellent film on the first joint surface.

8. The method according to claim 7, wherein cleaning of the first joint surface is performed by bringing a plasma gas into contact with the first joint surface.

9. The method according to claim 4, wherein the second joint surface is cleaned before the step of placing the first joint surface on the second joint surface.

10. The method according to claim 9, wherein cleaning of the second joint surface is performed by bringing a plasma gas into contact with the second joint surface.

11. The method according to claim 10, wherein the plasma gas is discharged to atmosphere.

12. The method according to claim 4, wherein the second member contains a fiber-reinforced resin containing a reinforcing fiber.

13. The method according to claim 4, wherein the first member contains any one of a thermoplastic resin, aluminum, an aluminum alloy, copper, a copper alloy, iron, stainless steel, a carbon material, glass, and ceramic.

* * * * *